(12) United States Patent
Chandra et al.

(10) Patent No.: US 7,461,169 B2
(45) Date of Patent: Dec. 2, 2008

(54) DHCP BASED HOME ADDRESS MANAGEMENT OF MOBILE IP CLIENTS

(75) Inventors: Madhavi Wunnava Chandra, Cary, NC (US); Milind M. Kulkarni, San Jose, CA (US); Kent K. Leung, Mountain View, CA (US); Alpesh Patel, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 731 days.

(21) Appl. No.: 10/300,437

(22) Filed: Nov. 19, 2002

(65) Prior Publication Data

US 2003/0217180 A1 Nov. 20, 2003

Related U.S. Application Data

(63) Continuation-in-part of application No. 10/241,969, filed on Sep. 11, 2002.

(60) Provisional application No. 60/362,251, filed on Mar. 5, 2002.

(51) Int. Cl.
*G06F 15/16* (2006.01)
*H04L 12/66* (2006.01)
*H04Q 7/20* (2006.01)

(52) U.S. Cl. ............... 709/245; 709/227; 709/228; 455/425; 455/437; 370/352

(58) Field of Classification Search ............... 709/245, 709/227, 228, 24; 455/422.1, 425, 433, 436–444; 370/352, 355, 356, 360, 373
See application file for complete search history.

(56) References Cited

U.S. PATENT DOCUMENTS 6,161,123 A 12/2000 Renouard et al.
6,163,843 A 12/2000 Inoue et al.

(Continued)

FOREIGN PATENT DOCUMENTS

EP 1126682 A 8/2001

OTHER PUBLICATIONS

DHCP RFC 2131, IETF, www.ietf.org, pp. 1-12.*

(Continued)

*Primary Examiner*—Bunjob Jaroenchonwanit
*Assistant Examiner*—Angela Widhalm
(74) *Attorney, Agent, or Firm*—Weaver Austin Villeneuve & Sampson LLP

(57) ABSTRACT

Methods and apparatuses for allowing mobile nodes to have access to mobility functions after being attached to their home networks are disclosed. The invention allows a home agent to authenticate a registration request and validate a DHCP-acquired home address even if no mobile bindings currently exist. Typically, a home agent will not create mobility bindings if a mobile node attaches itself to a home agent network segment. By using either cached information or DHCP resources, the home agent can approve a registration request.

34 Claims, 5 Drawing Sheets

U.S. PATENT DOCUMENTS

| | | | |
|---|---|---|---|
| 6,167,513 A | 12/2000 | Inoue et al. | |
| 6,230,012 B1 | 5/2001 | Willkie et al. | |
| 6,233,616 B1 | 5/2001 | Reid | |
| 6,339,830 B1 | 1/2002 | See et al. | 713/202 |
| 6,421,714 B1 | 7/2002 | Rai et al. | |
| 6,427,170 B1 | 7/2002 | Sitaraman et al. | |
| 6,442,616 B1* | 8/2002 | Inoue et al. | 709/245 |
| 6,463,134 B1 | 10/2002 | Okada et al. | |
| 6,473,411 B1* | 10/2002 | Kumaki et al. | 370/331 |
| 6,515,974 B1* | 2/2003 | Inoue et al. | 370/331 |
| 6,567,664 B1 | 5/2003 | Bergenwall et al. | |
| 6,636,894 B1 | 10/2003 | Short et al. | |
| 6,654,359 B1* | 11/2003 | La Porta et al. | 370/328 |
| 6,681,259 B1* | 1/2004 | Lemilainen et al. | 709/250 |
| 6,687,245 B2* | 2/2004 | Fangman et al. | 370/356 |
| 6,742,036 B1 | 5/2004 | Das et al. | |
| 6,766,168 B1 | 7/2004 | Lim | |
| 6,771,623 B2* | 8/2004 | Ton | 370/331 |
| 6,778,528 B1 | 8/2004 | Blair et al. | |
| 6,839,337 B2 | 1/2005 | Newberg et al. | |
| 6,892,069 B1* | 5/2005 | Flynn | 455/432.1 |
| 6,954,790 B2* | 10/2005 | Forslow | 709/227 |
| 6,973,057 B1 | 12/2005 | Forslow | |
| 6,973,528 B2 | 12/2005 | Forslow | |
| 7,031,275 B1* | 4/2006 | Borella et al. | 370/328 |
| 7,042,988 B2* | 5/2006 | Juitt et al. | 379/88.17 |
| 7,152,117 B1* | 12/2006 | Stapp et al. | 709/245 |
| 2001/0014917 A1 | 8/2001 | Ishiyama et al. | |
| 2002/0052954 A1* | 5/2002 | Polizzi et al. | 709/225 |
| 2002/0058480 A1* | 5/2002 | Ikeda | 455/67.1 |
| 2002/0073182 A1 | 6/2002 | Zakurdaev et al. | |
| 2002/0089958 A1 | 7/2002 | Feder et al. | |
| 2002/0114323 A1 | 8/2002 | Chowdhury et al. | |
| 2003/0018810 A1* | 1/2003 | Karagiannis et al. | 709/238 |
| 2003/0058853 A1* | 3/2003 | Gorbatov et al. | 370/389 |
| 2003/0101243 A1 | 5/2003 | Donahue et al. | |
| 2003/0104814 A1 | 6/2003 | Gwon et al. | |
| 2003/0119506 A1 | 6/2003 | Singhai et al. | |
| 2003/0126262 A1 | 7/2003 | Yoshida et al. | |
| 2003/0217145 A1 | 11/2003 | Leung et al. | |
| 2003/0217180 A1 | 11/2003 | Chandra et al. | |
| 2003/0224788 A1 | 12/2003 | Leung et al. | |
| 2004/0072557 A1 | 4/2004 | Paila et al. | |
| 2005/0286466 A1* | 12/2005 | Tagg et al. | 370/329 |

OTHER PUBLICATIONS

DHCP RFC 2131, IETF, www.ietf.org, p. 1-12.*

Vipul Gupta and Gabriel Montenegro, "Secure and mobile networking", 1998, Kluwer Academic Publishers, Mobile Networks and Applications vol. 3 Issue 4, p. 381-390.*

Victor C. Zandy and Barton P. Miller, "Reliable network connections", 2002, ACM, Networking Proceedings of the 8th annual international conference on mobile computing and networking, p. 95-106.*

Jenq-Haur Wang and Tzao-Lin Lee, "Enhanced intranet management in a DHCP-enabled environment", Aug. 2002, Proceedings of the 26th annual international computer software and applications Conference (COMPSAC) 2002, p. 893-898.*

Examiner's Communication pursuant to Article 96(2) EPC dated Mar. 1, 2006, from related European Patent Application No. 03742214.4, Methods and Apparatus for Anchoring of Mobile Nodes Using DNS, 6 pages.

Levkowetz, H. et al., "Mobile IP NAT/NAPT Traversal using UDP Tunneling," Internet Draft, Nov. 2001, 23 pages.

Khalil, Mohamed M. et al., "Generalized NAI (GNAI) Extension for Mobile IPv4," Internet Draft, Oct. 2001, 6 pages.

Adrangi, Farid and Prakash, Iyer, "Mobile IPv4 Traversal Across Firewalls," Internet Draft, Nov. 13, 2001, 30 pages.

Cardellini, V. et al., "Dynamic Load Balancing in Web-Server Systems," IEEE Internet computing, May 1999, XP002170537.

Heissenhuber, F. et al., "Home Agent Redundancy and Load Balancing in Mobile IPV6," Broadband communications, Proceedings of the International IFIP-IEEE Conference on Broadband communications, XX, XX, 10 Nov. 1999, pp. 235-244, XP009002035.

Johnson, D. B. et al, "Mobility support in IPV6," Internet Draft, XX, XX, 1 Jun. 2002, pp. I-V, 1-157, XP022963720.

International Search Report, Application No. PCT/US03/20106, Mailed Nov. 14, 2003; 4 pages.

"Wireless IP Network Standard," Version 3.0.0, Version Date: Jul. 16, 2001, 62 pages.

Calhoun et al, "Diameter Base Protocol," http://www.ietf.org/internet-drafts/draft-ietf-aaa-diameter-10.txt, Apr. 2002, 139 pages.

Calhoun et al, "Diameter Mobile IPv4 Application," http://www.ietf.org/internet-drafts/draft-ietf-aaa-mobileip-10.txt, Apr. 2002, 48 pages.

U.S. Appl. No. 10/187,084, Leung et al, "Methods and Apparatus For Anchoring of Mobile Nodes Using DNS," filed Jun. 28, 2002.

S. Glass, "Mobile IP Agents as DHCP Proxies", Internet Draft, Sun Microsystems, Inc., Mar. 2, 2000.

Giovanardi, *Transparent Mobile IP: an Approach and Implementation*, 1997, IEEE, pp. 1861-1865.

Giovanardi, Transparent Mobile IP: an Approach and Implementation, 1997, IEEE, pp. 1861-1865.

Leung et al., U.S. Office Action dated Apr. 19, 2007 from related U.S. Appl. No. 10/150,377.

Leung et al., U.S. Office Action dated Jul. 17, 2006 from related U.S. Appl. No. 10/150,377.

Leung et al., U.S. Office Action dated Jan. 25, 2006 from related U.S. Appl. No. 10/150,377.

Leung et al., U.S. Office Action dated Oct. 7, 2005 from related U.S. Appl. No. 10/150,377.

Leung et al., U.S. Office Action dated Mar. 10, 2005 from related U.S. Appl. No. 10/150,377.

Leung et al., U.S. Office Action dated Feb. 21, 2007 from related U.S. Appl. No. 10/187,084.

Leung et al., U.S. Office Action dated Aug. 15, 2006 from related U.S. Appl. No. 10/187,084.

Leung et al., U.S. Office Action dated Feb. 21, 2007 from related U.S. Appl. No. 10/241,969.

Leung et al., U.S. Office Action dated Sep. 22, 2006 from related U.S. Appl. No. 10/241,969.

Leung et al., U.S. Office Action dated May 2, 2006 from related U.S. Appl. No. 10/241,969.

Leung et al., U.S. Office Action dated Oct. 16, 2007 from related U.S. Appl. No. 10/150,377.

European Office Action dated Jun. 5, 2007 in related EP Application No. 03 742 214.4, 4 pgs.

Leung et al., U.S. Office Action dated Jul. 24, 2007 from related U.S. Appl. No. 10/187,084.

Leung et al., U.S. Office Action dated Jan. 10, 2008 from related U.S. Appl. No. 10/187,084.

Leung et al., U.S. Office Action dated Feb. 6, 2008 from related U.S. Appl. No. 10/150,377.

The Office Action issued on May 8, 2008 for Australian Patent Application No. 2003279928.

The provisional application for U.S. Appl. No. 60/362,251.

* cited by examiner

DHCP BASED HOME ADDRESS MANAGEMENT OF MOBILE IP CLIENTS

CROSS-REFERENCE TO RELATED APPLICATIONS

This application is a continuation-in-part of U.S. application Ser. No. 10/241,969, filed Sep. 11, 2002, which claims the benefit of U.S. Provisional Application No. 60/362,251, filed Mar. 5, 2002, both of which are incorporated herein by reference in their entireties and for all purposes. This application is related to Ser. No. 10/150,377, filed May 17, 2002, and Ser. No. 10/187,084, filed Jun. 28, 2002, both of which are incorporated herein by reference in their entireties and for all purposes, and both of which claim benefit of U.S. Provisional Application No. 60/362,251, filed Mar. 5, 2002.

BACKGROUND OF THE INVENTION

1. Field of the Invention

The present invention relates generally to mobile computing and more specifically to roaming of mobile nodes.

2. Description of the Related Art

Mobile IP is a protocol that allows laptop computers and other mobile computer units ("mobile nodes") to roam between various sub-networks while maintaining Internet and/or WAN connectivity. Without Mobile IP or similar protocols a mobile node would be unable to stay connected while roaming from one location serviced by one sub-network to another location being serviced by a different sub-network. This is because each IP address has a field that specifies the particular sub-network on which the node resides. If a user desires to take a computer that is normally attached to one node and roam so that it passes through different sub-networks, the roaming computer cannot use its home base IP address. As a result, a businessperson traveling across the country cannot travel with his or her computer across geographically disparate network segments or wireless nodes while maintaining Internet connectivity. This is not acceptable in the age of portable computational devices.

To address this problem, the Mobile IP protocol has been developed and implemented. An implementation of Mobile IP is described in RFC 3344, "IP Mobility Support for IPv4" of the Network Working Group, C. Perkins, Ed., January 2002. Mobile IP is also described in the text "Mobile IP, The Internet Unplugged" by J. Solomon, Prentice Hall, 1998. Both of these references are incorporated herein by reference in their entireties and for all purposes.

The Mobile IP process and environment are illustrated in FIG. 1. A Mobile IP environment 100 includes the Internet (or a WAN) 105 over which a mobile node 110 can communicate via mediation by a home agent 115 or a foreign agent 120. Typically, the home agent 115 and foreign agent 120 are routers or other network connection devices performing appropriate Mobile IP functions as implemented by software, hardware, and/or firmware. Note the overall network topology is arbitrary, and elements such as the home agent 115 need not directly connect to the Internet 105. For example, the home agent 115 may be connected through another router R2 125. Router R2 125 may, in turn, connect one or more other routers R3 130 with the Internet 105.

When mobile node 110 is plugged into its home network segment 135 it connects with the Internet 105 through its designated home agent 115. When the mobile node 110 roams, it can be connected to a remote network segment 140 and communicate through the available foreign agent 120. Other nodes, such as a PC 145, on remote network segment 140 also communicate with the Internet 105 through foreign agent 120. Presumably, there are many foreign agents available at geographically disparate locations to allow wide spread Internet connection via the Mobile IP protocol.

Mobile node 110 may identify foreign agent 120 through various agent solicitations and agent advertisements that form part of the Mobile IP protocol. When mobile node 110 engages with remote network segment 140, it composes a registration request for the home agent 115 to bind the mobile node's 110 current location with its home location. Foreign agent 120 then relays the registration request 150 to home agent 115. During the registration process, the home agent 115 and the mobile node 110 may then negotiate the conditions of the mobile node's 110 attachment to foreign agent 120. For example, the mobile node 110 may request a registration lifetime of 5 hours, but the home agent 115 may grant only a 3 hour period. When the negotiation is successfully completed, home agent 115 updates an internal "mobility binding table" which links the mobile node's 110 current location via its care-of address (e.g., a co-located care-of address or the foreign agent's IP address) to the identity (e.g., home address) of the mobile node 110. Further, if the mobile node 110 registered via foreign agent 120, the foreign agent 120 updates an internal "visitor table" which specifies the mobile node address, home agent address, etc. The home agent's 115 association between a mobile node's home base IP address, its current care-of address, and the remaining lifetime of that association is referred to as a binding.

If mobile node 110 wanted to send a message to a correspondent node 155 from its new location, the mobile node 110 would forward a packetized output message 160 through the foreign agent 120 over the Internet 105 to the correspondent node 155 according to standard Internet protocols. However, if the correspondent node 155 wanted to send a message 165 to the mobile node 110—whether in reply to a message from the mobile node 110 or for any other reason—the correspondent node 155 addresses that message to the IP address of the mobile node 110 as if the mobile node 110 were on the home network segment 135. The packets of the message from the correspondent node 155 are forwarded over the Internet 105 to the router R2 125 and ultimately to the home agent 115.

From the home agent's 115 mobility binding table, the home agent 115 recognizes that the mobile node 110 is no longer attached to the home network segment 135. The home agent 115 then encapsulates the packets from correspondent node 155 (which are addressed to the mobile node 110 on the home network segment 135) according to the Mobile IP protocol, and forwards these encapsulated packets 170 to the appropriate care-of address for mobile node 110. If the care-of address is the IP address of the foreign agent 120 the foreign agent 120 strips the encapsulation and forwards the message to the mobile node 110 on the remote network segment 140. The packet forwarding mechanism implemented by the home agent 115 to the foreign agent 120 is often referred to as "tunneling."

As set forth in RFC 3344, the Mobile IP specification, the mobile node 110 can be statically provisioned with its home address or request home address assignment. Home address assignment is typically requested by setting the home address field of the registration request to 0.0.0.0 and using a mobile node network address identifier (NAI) extension to identify itself. NAI is described in RFC 2794 of the Network Working Group, P. Calhoun and C. Perkins, March 2000, incorporated herein by reference in its entireties and for all purposes. After receiving and authenticating such a registration request, the home agent is expected to assign a home address to the mobile node in the registration reply.

One proposal for home address assignment by the home agent is described in the IETF working group draft, "Mobile IP Agents as DHCP Proxies," S. Glass, draft-glass-mobileip-agent-dhcp-proxy-01.txt, Mar. 2, 2000, incorporated herein by reference in its entirety and for all purposes. In that draft, the home agent behaves as a DHCP proxy agent, acting on behalf of the mobile node.

DHCP is based on the Bootstrap Protocol (BOOTP), an Internet protocol that enables a diskless workstation to discover its own IP address. DHCP is described in RFC 2131 of the Network Working Group, R. Droms, March 1997, and BOOTP is described in RFC 951 of the Network Working Group, B. Croft, September 1985, both references incorporated herein by reference in their entirety and for all purposes. RFC 2131 defines a DHCP server as a host that provides initialization parameters through DHCP. Essentially, a DHCP server allows IP addresses to be dynamically assigned to devices on a network. Dynamic addressing simplifies network administration because the software keeps track of IP addresses rather than requiring an administrator to statically provision the IP address for every device on the network. Current Microsoft Windows® operating systems have integrated DHCP client support.

Although Mobile IP has many well-defined mechanisms that are useful for mobility services, RFC 3344 also states, "When connected to its home network, a mobile node operates without the support of mobility services. That is, it operates in the same way as any other (fixed) host or router." However, the mechanism by which a mobile node achieves this operation has not been described. Furthermore, once a mobile node is connected to home network, and is acting as "any other (fixed) host or router," no mechanisms are available to allow the mobile node to roam.

SUMMARY OF THE INVENTION

The present invention provides methods and apparatuses for mobile nodes home address management. In one embodiment a mobile node attaches itself to the mobile node's home agent network segment. The mobile node then performs agent discovery procedures and sends out a registration request to the home agent, requesting a home address. The mobile node then receives a registration reply with an allocated home address. The reply indicates that no mobility bindings have been created since the mobile node is on its home network, and the mobile node is responsible for its own DHCP address management.

In another embodiment a home agent receives a registration request for a mobile node for which mobility bindings do not exist. The registration request indicates that a dynamically assigned home address has already been acquired. The home agent then authenticates the mobile node and creates mobility bindings for the mobile node. Afterwards, the home agent sends a registration reply to the mobile node.

DETAILED DESCRIPTION OF THE PREFERRED EMBODIMENTS

In the following description, numerous specific details are set forth to provide a thorough understanding of the present invention. It will be obvious, however, to one skilled in the art that the present invention may be practiced without some or all of these specific details. In other instances, well known process steps have not been described in detail in order to avoid unnecessarily obscuring the present invention.

The present invention allows a mobile node that connects to a home network to use mobility services if the mobile node later roams. A home agent is able to authenticate a roaming mobile node, even though mobility bindings were not created. Methods by which a home agent can accomplish this include use of cached information and performing a DHCP INFORM on the mobile node's IP address.

Figure 1:
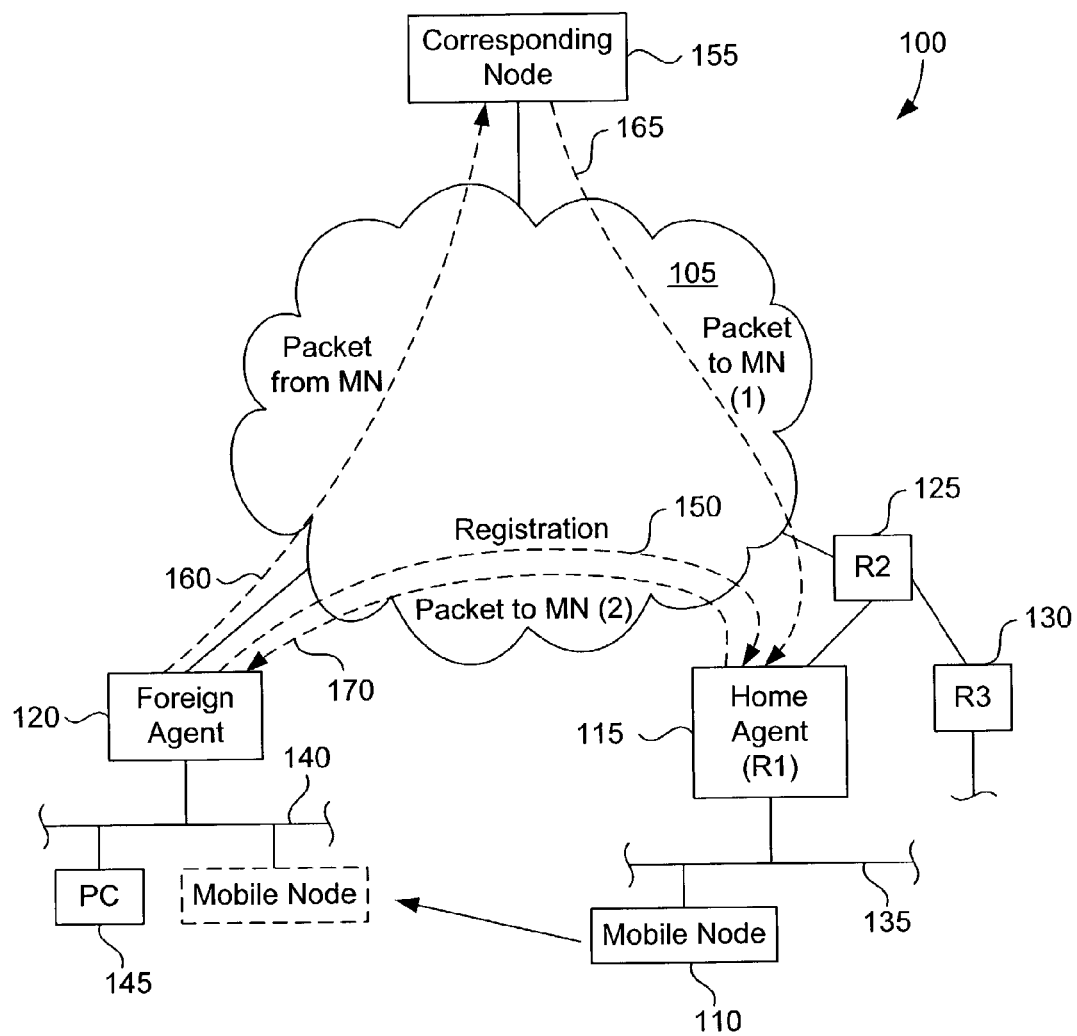
FIG. 1 is a block diagram of a Mobile IP environment.
Figure 2:
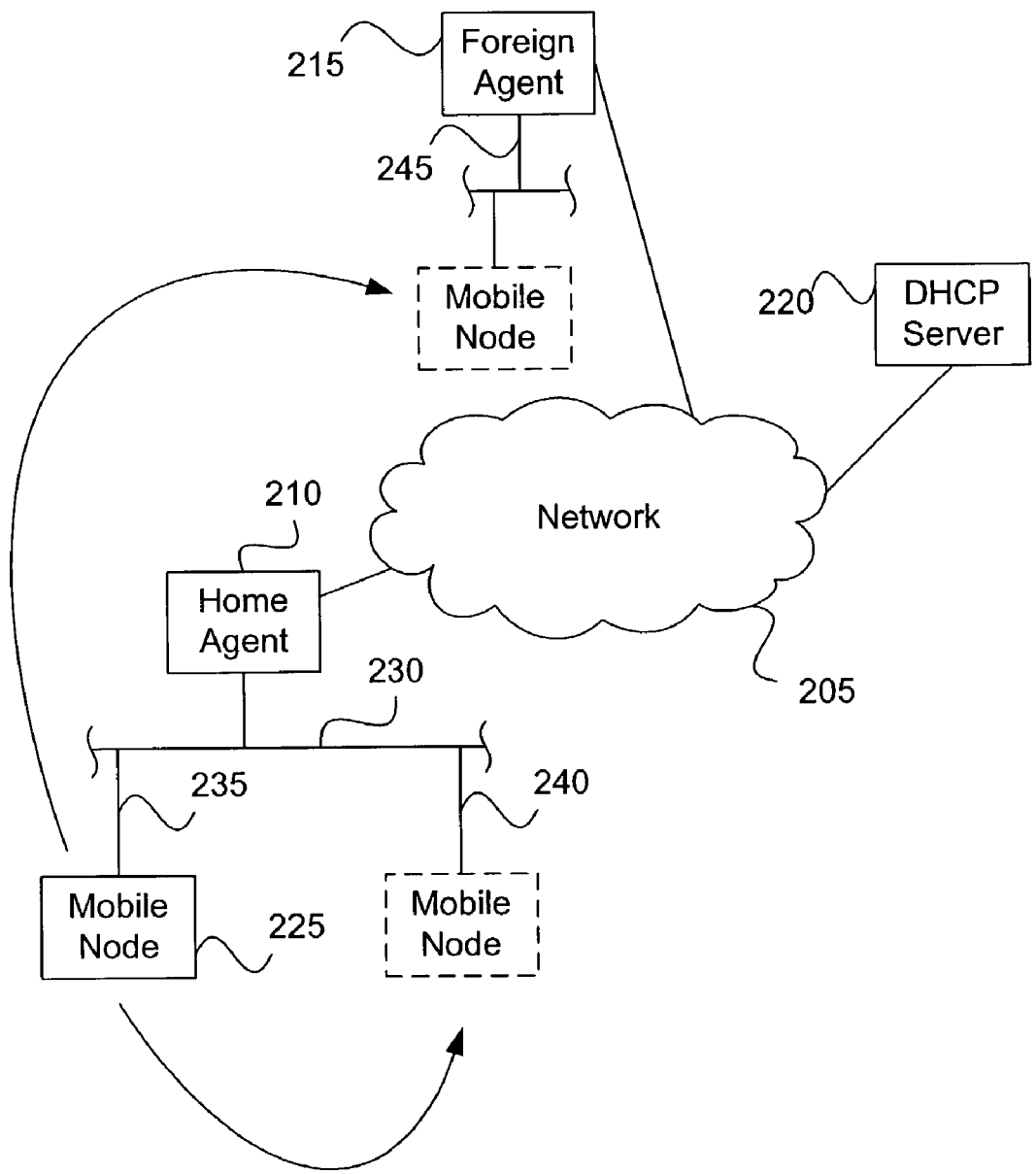
FIG. 2 is a block diagram illustrating an exemplary environment in which the present invention may be implemented.

FIG. 2 is a block diagram illustrating an exemplary environment in which the present invention may be implemented. A network 205 contains a home agent 210, a foreign agent 215, a DHCP server 220, and a mobile node 225. The mobile node 225 can attach itself to the home agent 210 via the home agent network segment 230, which may have several different ports 235 and 240, and the mobile node 225 can attach itself to the foreign agent 215 via the foreign agent network segment 245.

Figure 3:
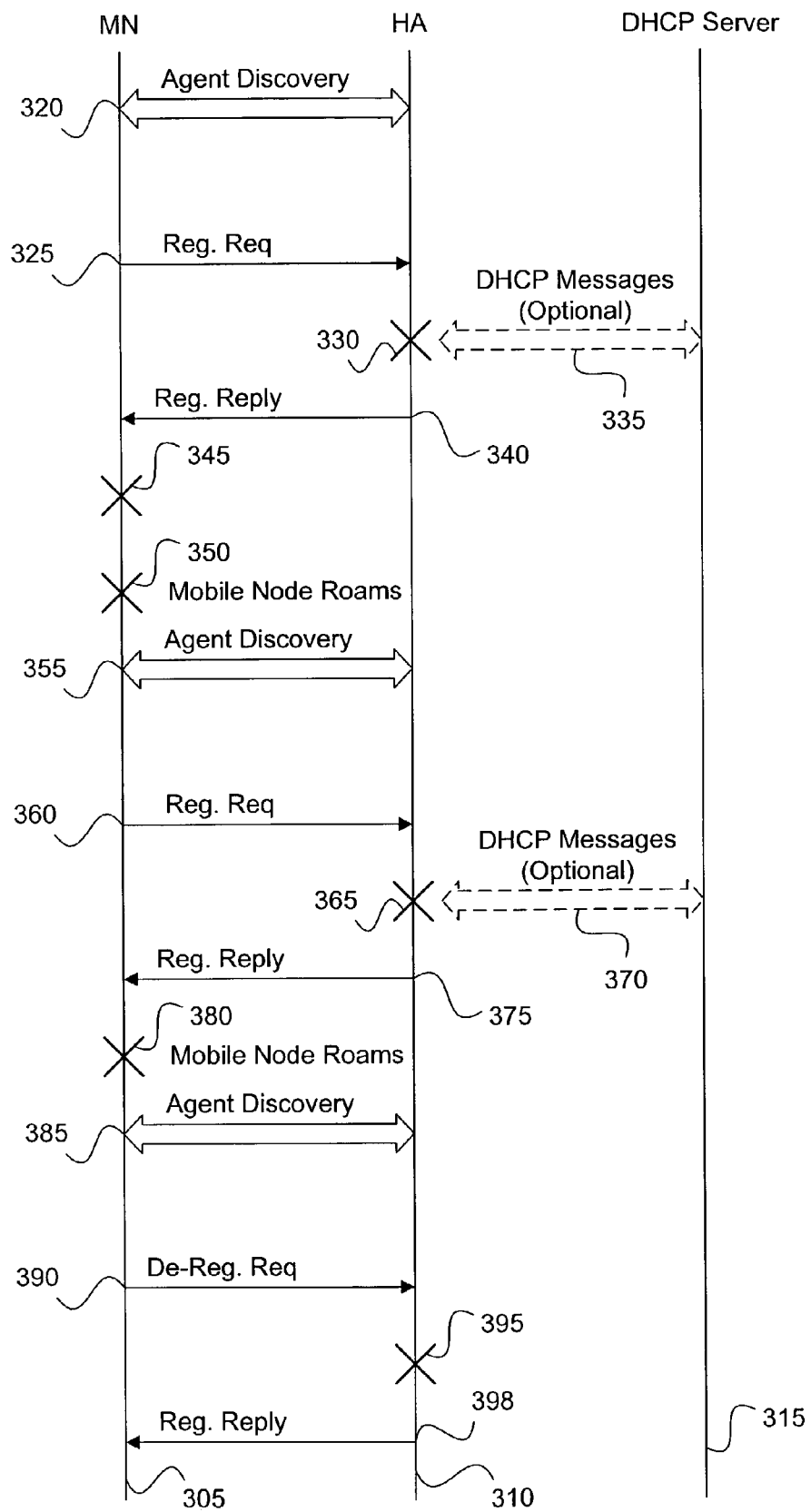
FIG. 3 is a control flow diagram illustrating a method of allowing a mobile node to use the same IP address it was initially assigned with DHCP for Mobile IP purposes when the mobile node boots up on the home agent's network segment.

FIG. 3 is a control flow diagram illustrating an implementation of the invention. Steps performed by the mobile node 225, the home agent 210 and DHCP server 220 are represented by corresponding vertical lines 305, 310, and 315.

At 320 the mobile node 225 and the home agent 210 perform standard agent discovery procedures (e.g., the home agent 210 sends an agent advertisement, either on its own or in response to an agent solicitation from the mobile node 225). Once agent discovery is complete, at 325 the mobile node 225 sends out a registration request, similar to a standard registration request that the mobile node 225 sends out when it finds itself on the foreign agent network segment 245. The mobile node 225 could append a DHCP extension that indicates that the mobile node 225 wants an address allocated via DHCP.

Additionally, the DHCP extension can have a bit indicating that the mobile node 225 wants to manage its home address via DHCP. Upon receipt of the registration request, the home agent 210 does DHCP address allocation for the mobile node 225. As requested by the mobile node 225, the home agent 210 sends the DHCP server 220 information, lease lifetime, and subnet mask information in a DHCP extension appended to the registration reply back to the mobile node 225. When the mobile node 225 is attached via the home agent network segment 230 and the mobile node 225 asked for DHCP information indicating that it is DHCP aware, the home agent 210 can specifically ask the mobile node 225 to manage its own home address via DHCP. The home agent 210 informs the mobile node 225 of this by setting the M bit in the DHCP extension in the registration reply.

Depending on the specific embodiment, the home agent 210 can process the message several different ways at 330. For example, if the home agent 210 had cached the mobile node's 225 original DHCP request, as described in U.S. application Ser. No. 10/241,969, the home agent 210 could immediately submit a registration reply back to the mobile node 225, reusing the DHCP address as the mobile node's 225 home address.

Other methods of assigning a home address to the mobile node 225 include referring to a static internal table of available IP addresses, using an AAA server or using a DHCP server 220 to assign a home address. If the mobile node 225 did not identify a source IP address (i.e., it did not receive a prior DHCP address), the home agent 210 could use the gateway interface address (giaddr) of the registration request at 325 in its communications with the DHCP server 220 at 335. Communications with the DHCP server 220 could then include a DHCP discover, a DHCP offer, a DHCP request and a DHCP acknowledgement.

Once the home agent 210 determines a home address for the mobile node 225, it can optionally cache the home address, the NAI and the MAC address. However, no mobility bindings need to be created at 330 since the mobile node is on its home network.

At 340 the home agent 210 sends a registration reply to the mobile node 225. The registration reply should contain the NAI, the home address of the mobile node 225, the address of the home agent 210, and a lifetime.

At 345 a zero lifetime will alert the mobile node 225 that the home agent 210 has not created any mobility bindings, and the M bit in the DHCP extension relays that the mobile node 225 is responsible for its own DHCP address management.

Any number of other methods could also be used to alert the mobile node of its address management responsibilities. For example, an extension to the registration reply could also alert the mobile node 225 of its responsibilities. Alternatively, the mobile node 225 could have determined that it was in its home network segment 230 from the agent discovery procedures at 320.

Once the mobile node 225 is alerted to its address management responsibilities, the mobile node 225 will also need to have the IP address of the DHCP server 220 and the net prefix in order to perform these responsibilities. If the mobile node 225 did not already receive the information in accordance with the method described in U.S. application Ser. No. 10/241,969 or through some other means, the home agent 210 could include the DHCP server 220 address and the net prefix in the registration reply. Therefore, for as long as the mobile node 225 was attached to the appropriate port 235 on the home agent network segment 230, it would act as any other fixed host.

At 350 the mobile node 225 roams to another port 240 on the home agent network segment 230. At 355 the mobile node 225 conducts agent discovery procedures and detects movement. At 360 the mobile node 225 sends a registration request to the home agent 210 with an appended DHCP extension, indicating that the home address was already acquired via DHCP by setting the H bit in the DHCP extension. Since the NAI is mapped to the client ID in DHCP, the home agent 210 would require the DHCP information in order to authorize the mobile node's 225 home address. The mobile node 225 might have to supply the information (DHCP server address, subnet mask etc), depending on whether the home agent 210 previously cached the information.

At 365 the home agent 210 processes the registration request. In order to authenticate the request, the home agent 210 would either refer to its cache or, if no cache was kept, at 370 the home agent 210 could perform a DHCP INFORM on the mobile node's 225 IP address in order to get the required information. If the home agent 210 referred to its cache to authenticate the mobile node 225, it could also ping the home address to ensure the DHCP server 220 did not give out the address to another device in the interim. Once the mobile node 225 is authenticated, the home agent 210 would create mobility bindings. However, since the mobile node 225 was still connected to the home agent 210, no tunnels need to be created.

At 375 the home agent 210 sends a registration reply to the mobile node 225, and the mobile node 225 would have access to fill mobility services. If the DHCP TLV M bit was set, the mobile node 225 could continue to renew its lease with the DHCP address directly. Otherwise the home agent 210 would provide DHCP proxy services.

At 380 the mobile node 225 roams back to the original port 235 on the home agent network segment 230. At 385 the mobile node 225 conducts agent discovery procedures and detects movement. At 390 the mobile node 225 sends a deregistration request to the home agent 210, requesting the home agent 210 delete its bindings so the mobile node 225 can act as any other fixed node.

At 395 the home agent 210 can delete the bindings to the mobile node 225 If a tunnel was created, it would also be deleted. If the home agent 210 uses the cached information method for authenticating later registration requests, the home agent 210 might need to re-cache information relating to the mobile node 225. At 398 the home agent 210 sends a registration reply back to the mobile node 225. Once again, the mobile node 225 would be responsible for its DHCP management responsibilities.

Figure 4:
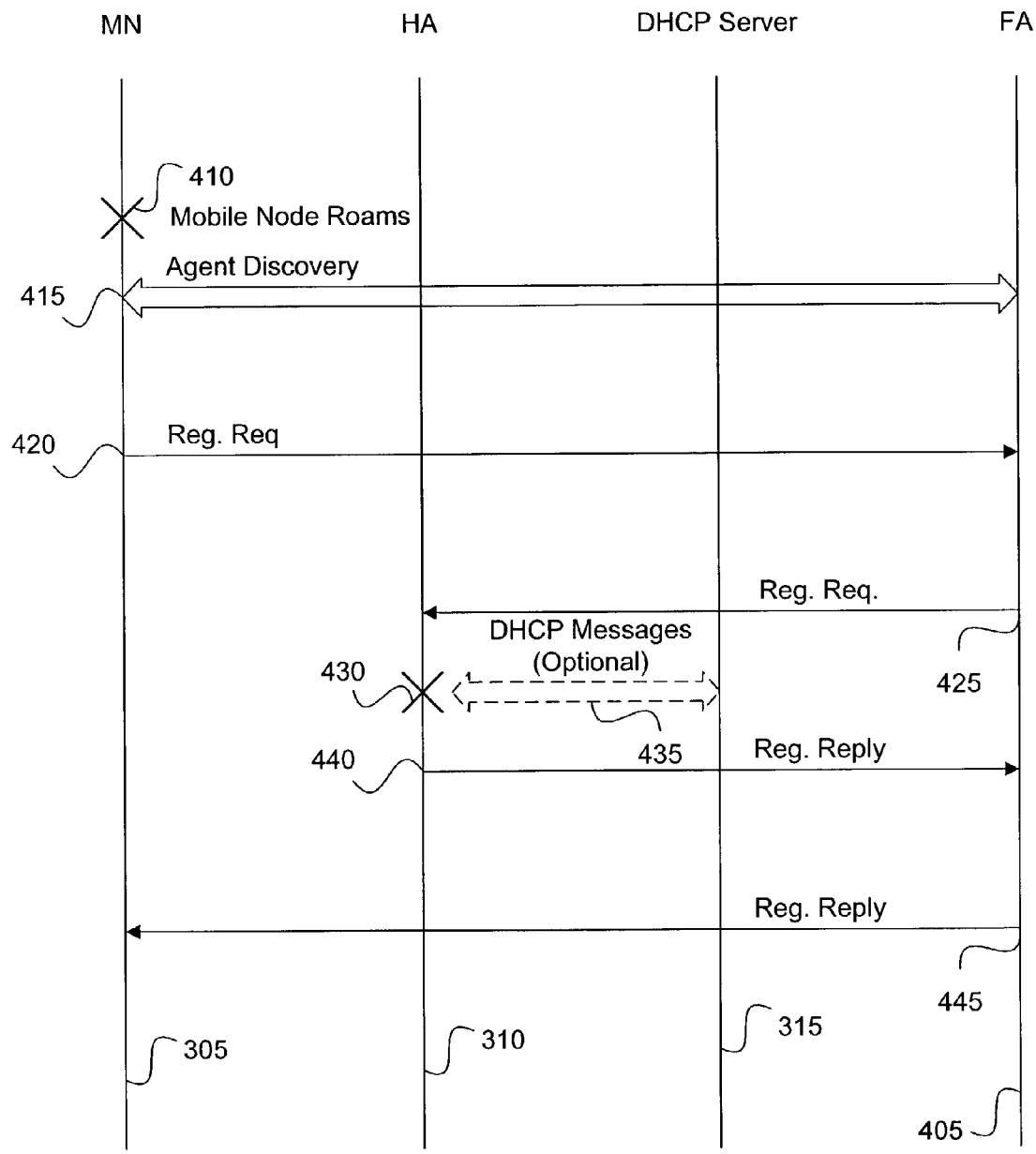
FIG. 4 is a diagram illustrating an exemplary network device in which various embodiments of the invention may be implemented.

FIG. 4 is a control flow diagram illustrating an implementation of the invention. Steps performed by the mobile node 225, the home agent 210, DHCP server 220 and foreign agent 215 are represented by corresponding vertical lines 305, 310, 315 and 405.

At 410 the mobile node 225 roams to the foreign agent network segment 245 from its original port 235 on the home agent network segment 230. It does not matter whether the mobile node 225 had previously roamed and deregistered (as described in FIG. 3) or whether the foreign agent network segment 245 is the mobile node's 225 first roam.

At 415 the mobile node 225 conducts agent discovery procedures and detects movement. At 420 the mobile node 225 sends a registration request with an appended DHCP extension to the home agent 210, indicating that the home address was already acquired by setting the H bit in the DHCP extension. Depending upon which scheme is being used, the mobile node 225 might also have to supply the DHCP information in order to authorize the mobile node's 225 home address.

At 425 the foreign agent 215 relays the registration request to the home agent 210. Once the home agent 210 receives the registration request at 430, it must authenticate the request. The home agent 210 would either refer to its cache or at 435 perform a DHCP INFORM on the mobile node's 225 IP address in order to get the required information. A ping on the mobile node's 225 IP address might also be appropriate. Once the mobile node 225 is authenticated, the home agent 210 would create mobility bindings and an appropriate tunnel.

At 440 the home agent 210 sends a registration reply to the foreign agent 215, which relays the registration reply to the mobile node 225 at 445. Once the mobile node 225 receives the registration reply it would have access to full mobility services.

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, home agents, and foreign agents of this invention may be implemented in specially configured routers, switches or servers, such as specially configured router models 2600, 3200, 3600, 4500, 7200, and 7500 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 5:
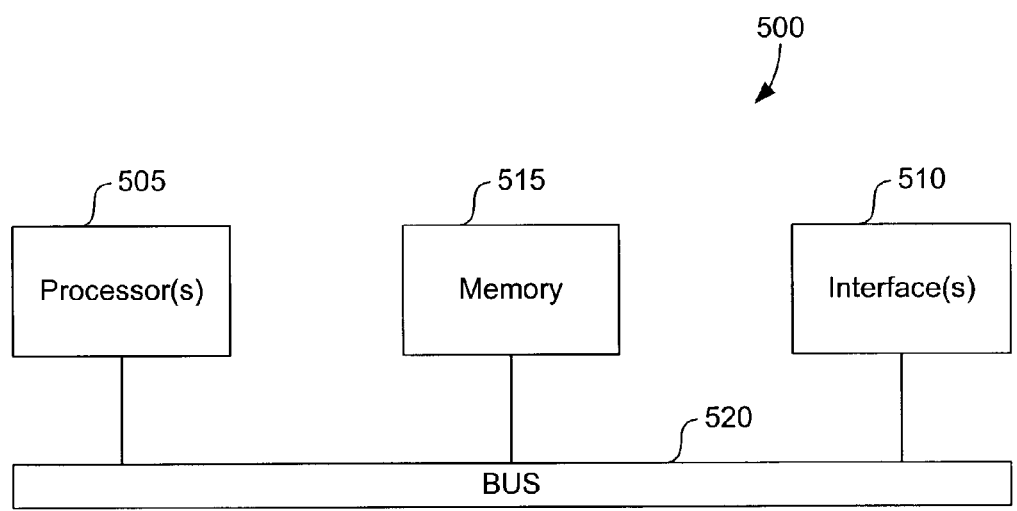
FIG. 5 is a diagram illustrating a network device suitable for implementing the techniques of the present invention.

Referring now to FIG. 5, a network device 500 suitable for implementing the techniques of the present invention includes a master central processing unit (CPU) 505, interfaces 510, memory 515 and a bus 520. When acting under the control of appropriate software or firmware, the CPU 505 may be responsible for implementing specific functions associated with the functions of a desired network device. For example, when configured as an intermediate router, the CPU 505 may be responsible for analyzing packets, encapsulating packets, and forwarding packets for transmission to a set-top box. The CPU 505 preferably accomplishes all these functions under the control of software including an operating system (e.g. Windows NT), and any appropriate applications software.

CPU 505 may include one or more processors such as those from the Motorola family of microprocessors or the MIPS family of microprocessors. In an alternative embodiment, the processor is specially designed hardware for controlling the operations of network device 500.

The interfaces 510 are typically provided as interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the CPU 405 to efficiently perform routing computations, network diagnostics, security functions, etc.

Although the system shown in FIG. 4 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, the memory 515) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being configured to comply with Mobile IP standards in force as of the time this document was written. However, it should be understood that the invention is not limited to such implementations. Accordingly, the present embodiments are to be considered as illustrative and not restrictive, and the invention is not to be limited to the details given herein, but may be modified within the scope and equivalents of the appended claims.

What is claimed is:
1. In a Home Agent, a method, comprising:
receiving a first registration request from a mobile node, the first registration request indicating a request for assignment of a home address;
obtaining a DHCP address from a DHCP server for use as the home address; and
sending a first registration reply to the mobile node, the first registration reply including the DHCP address that has been obtained from the DHCP server, DHCP server information associated with the DHCP server, and a lease lifetime associated with the DHCP address, wherein the DHCP address is used as a home address of the mobile node when the mobile node is at its home network and when roaming to a foreign network, thereby enabling the mobile node to manage the home address, wherein the first registration reply notifies the mobile node that it is responsible for renewing or extending the lease lifetime associated with the DHCP address;

wherein the mobile node is responsible for renewing or extending the lease lifetime associated with the DHCP address by contacting the DHCP server using the DHCP server information.

2. The method as recited in claim 1, further comprising:
receiving a second registration request from the mobile, the second registration request indicating that a dynamically assigned home address has already been acquired;
authenticating the mobile node; and
creating a mobility binding for the mobile node.

3. The method as recited in claim 2, wherein authenticating the mobile node includes referring to cached information about the mobile node.

4. The method as recited in claim 3, wherein the cached information was generated in response to the first registration request from the mobile node.

5. The method as recited in claim 4, wherein a cached DHCP acknowledgement message included the cached information.

6. The method as recited in claim 3, wherein the first registration request was received when the mobile node was on the home agent's network segment and the cached information was generated when the mobile node was on the home agent's network segment.

7. The method as recited in claim 6, wherein the first registration request includes a lifetime value of zero.

8. The method as recited in claim 2, wherein authenticating the mobile node includes performing a DHCP INFORM on the home address.

9. The method as recited in claim 1, wherein the mobile node was alerted to its DHCP address management responsibilities in a DHCP extension of the first registration reply.

10. The method as recited in claim 1, wherein the mobile node previously requested that it be responsible for managing its own DHCP address via a DHCP extension of the first registration request.

11. The method as recited in claim 1, wherein the mobile node was alerted to its DHCP address management responsibilities via a lifetime of zero in the first registration reply.

12. The method as recited in claim 1, further comprising performing a ping operation on the home address to ensure that a DHCP server did not give out the home address to another device.

13. The method as recited in claim 1, wherein obtaining a DHCP address via a DHCP server comprises sending a DHCP request to the DHCP server, wherein the first registration request is received when the mobile node is on the home agent's network segment.

14. The method as recited in claim 13, wherein the DHCP request includes the mobile node's gateway interface address.

15. The method as recited in claim 1, wherein the first registration request includes information relating to DHCP address management.

16. The method as recited in claim 1, wherein the DHCP server is separate from the Home Agent.

17. In a mobile node, a method comprising:
sending a registration request to a home agent of the mobile node, the registration request indicating a request for assignment of a home address;
receiving a registration reply indicating that no mobility bindings have been created for the mobile node and the mobile node is responsible for its own DHCP address management, wherein the registration reply includes a single DHCP address that has been obtained via a DHCP server for use as the home address for the mobile node, a lease lifetime associated with the home address, and DHCP server information associated with the DHCP server, wherein the single DHCP address is used as the home address of the mobile node when the mobile node is at its home network and when roaming to a foreign network; and
contacting the DHCP server using the DHCP server information to extend or renew the lease lifetime associated with the single DHCP address that functions as the home address.

18. A home agent comprising:
a processor; and
memory, operably connected with the processor;
wherein at least one of the processor or the memory are adapted for:
receiving a first registration request from a mobile node, the first registration request indicating a request for assignment of a home address;
obtaining a DHCP address from a DHCP server for use as the home address; and
sending a first registration reply to the mobile node, the first registration reply including the DHCP address that has been obtained from the DHCP server, DHCP server information associated with the DHCP server, and a lease lifetime associated with the DHCP address, wherein the DHCP address is used as a home address of the mobile node when the mobile node is at its home network and when roaming to a foreign network, thereby enabling the mobile node to manage the home address, wherein the first registration reply notifies the mobile node that it is responsible for renewing or extending the lease lifetime associated with the DHCP address;
wherein the mobile node is responsible for renewing or extending the lease lifetime associated with the DHCP address by contacting the DHCP server using the DHCP server information.

19. The home agent as recited in claim 18, at least one of the processor or the memory being further adapted for:
receiving a second registration request from the mobile, the second registration request indicating that a dynamically assigned home address has already been acquired;
authenticating the mobile node; and
creating a mobility binding for the mobile node.

20. The home agent of claim 19, wherein authenticating the mobile node includes referring to cached information about the mobile node.

21. The home agent of claim 20, wherein the cached information was generated in response to the first registration request from the mobile node.

22. The home agent of claim 21, wherein a cached DHCP acknowledgement message included the cached information.

23. The home agent of claim 20, wherein the first registration request was received when the mobile node was on the home agent's network segment and the cached information was generated when the mobile node was on the home agent's network segment.

24. The home agent of claim 19, wherein authenticating the mobile node includes performing a DHCP INFORM on the home address.

25. The home agent of claim 18, wherein the first registration request indicates that the mobile node requests that it be responsible for managing its own home address, wherein managing its own home address includes renewing or extending its lease for the home address by contacting the DHCP server directly using the DHCP server information.

26. The home agent of claim 18, wherein the first registration reply includes an extension indicating that the mobile node is responsible for managing the DHCP address.

27. The home agent of claim 18, wherein at least one of the processor or the memory are further adapted for:
  performing a ping operation on the home address to ensure that a DHCP server did not give out the home address to another device.

28. The home agent of claim 18, wherein obtaining a DHCP address via a DHCP server comprises sending a DHCP request to the DHCP server, wherein the first registration request is received when the mobile node is on the home agent's network segment.

29. The home agent of claim 28, wherein the DHCP request includes the mobile node's gateway interface address.

30. The home agent of claim 18, wherein the first registration request includes information relating to DHCP address management.

31. A mobile node comprising:
  a processor; and
  a memory, operably connected with the processor;
  wherein at least one of the processor or the memory are adapted for:
  sending a registration request to a home agent of the mobile node, the registration request indicating a request for assignment of a home address;
  receiving a registration reply indicating that no mobility bindings have been created for the mobile node and the mobile node is responsible for its own DHCP address management, wherein the registration reply includes a single DHCP address that has been obtained via a DHCP server for use as the home address for the mobile node, a lease lifetime associated with the home address, and DHCP server information associated with the DHCP server, wherein the single DHCP address is used as the home address of the mobile node when the mobile node is at its home network and when roaming to a foreign network; and
  contacting the DHCP server using the DHCP server information to extend or renew the lease lifetime associated with single DHCP address that is used as the home address.

32. A home agent comprising:
  means for receiving a first registration request from a mobile node, the first registration request indicating a request for assignment of a home address;
  means for obtaining a DHCP address from a DHCP server for use as the home address; and
  means for sending a first registration reply to the mobile node, the first registration reply including the DHCP address that has been obtained from the DHCP server, DHCP server information associated with the DHCP server, and a lease lifetime associated with the DHCP address, wherein the DHCP address is used as a home address of the mobile node when the mobile node is at its home network and when roaming to a foreign network, thereby enabling the mobile node to manage the home address, wherein the first registration reply notifies the mobile node that it is responsible for renewing or extending the lease lifetime associated with the DHCP address;
  wherein the mobile node is responsible for renewing or extending the lease lifetime associated with the DHCP address by contacting the DHCP server using the DHCP server information.

33. A mobile node comprising:
  means for sending a registration request to a home agent of the mobile node, the registration request indicating a request for assignment of a home address;
  means for receiving a registration reply indicating that no mobility bindings have been created for the mobile node and the mobile node is responsible for its own DHCP address management, wherein the registration reply includes a single DHCP address that has been obtained via a DHCP server for use as the home address for the mobile node, a lease lifetime associated with the home address, and DHCP server information associated with the DHCP server, wherein the single DHCP address is used as the home address of the mobile node when the mobile node is at its home network and when roaming to a foreign network; and
  means for contacting the DHCP server using the DHCP server information to extend or renew the lease lifetime associated with the home address.

34. In a home agent, a method of processing a registration request received from a mobile node, comprising:
  receiving a request for assignment of a DHCP address, the request being received from a mobile node;
  determining whether the mobile node is on its home network;
  obtaining a DHCP address from a DHCP server for use as a home address for the mobile node when the mobile node is at its home network and when roaming to a foreign network;
  providing the DHCP address, a lease lifetime associated with the DHCP address, and DHCP server information associated with the DHCP server to the mobile node; and
  informing the mobile node that it is responsible for its own DHCP address management, wherein the DHCP address management includes contacting the DHCP server directly using the DHCP server information in order to renew or extend the lease lifetime of the DHCP address.

* * * * *